(12) United States Patent
Thorsen et al.

(10) Patent No.: US 7,563,370 B2
(45) Date of Patent: Jul. 21, 2009

(54) SEMI-PERMEABLE MEMBRANE FOR USE IN OSMOSIS AND METHOD AND PLANT FOR PROVIDING ELEVATED PRESSURE BY OSMOSIS TO CREATE POWER

(75) Inventors: Thor Thorsen, Trondheim (NO); Torleif Holt, Trondheim (NO)

(73) Assignee: Statkraft Development AS, Oslo (NO)

( * ) Notice: Subject to any disclaimer, the term of this patent is extended or adjusted under 35 U.S.C. 154(b) by 583 days.

(21) Appl. No.: 10/343,735

(22) PCT Filed: Jul. 20, 2001

(86) PCT No.: PCT/NO01/00314

§ 371 (c)(1),
(2), (4) Date: Jun. 30, 2003

(87) PCT Pub. No.: WO02/13955

PCT Pub. Date: Feb. 21, 2002

(65) Prior Publication Data

US 2008/0169723 A1 Jul. 17, 2008

Related U.S. Application Data

(60) Provisional application No. 60/228,778, filed on Aug. 29, 2000.

(30) Foreign Application Priority Data

Aug. 4, 2000 (NO) .................................. 20003977

(51) Int. Cl.
*B01D 65/00* (2006.01)

(52) U.S. Cl. ............................ 210/321.65; 210/170.11; 210/321.6; 210/321.66; 210/321.88; 290/54

(58) Field of Classification Search ................ 210/137, 210/321.65, 321.66, 500.27, 637, 650, 652, 210/653, 170.11, 321.6, 321.88, 321.89; 290/43, 54; 60/326, 649; 428/304.4; 73/38, 73/40, 861.42

See application file for complete search history.

(56) References Cited

U.S. PATENT DOCUMENTS 3,133,132 A * 5/1964 Loeb et al. .................. 264/49

(Continued)

FOREIGN PATENT DOCUMENTS

| EP | 0 591 116 | 4/1994 |
| EP | 0 882 493 | 12/1998 |
| WO | 0 033 948 | 6/2000 |

OTHER PUBLICATIONS

"Direct contact membrane distillation: modelling and concentration experimentations" Furtunato Laguna et al, Journal of Membrane Science vol. 66, Feb. 14, 2000, pp. 1-11.*
Disclosure of Abandoned Patil U.S. Appl. No. 09/342,779, filed Jun. 29, 1999.*

(Continued)

*Primary Examiner*—Joseph W Drodge
(74) *Attorney, Agent, or Firm*—Birch, Stewart, Kolasch & Birch, LLP

(57) ABSTRACT

The present invention concerns a semi-permeable membrane for use in osmosis consisting of one thin layer of a non-porous material (the diffusion skin), and one or more layers of a porous material (the porous layer), where the porous layer has a structure where porosity $\phi$, thickness of the porous layer (m), and tortuosity $\tau$, are related to one another as given by the expression:

$$x \cdot \tau = \phi \cdot S$$

wherein S is a structure parameter having a value equal to or less than 0.0015 meter.

Further a method for providing elevated pressure by osmosis as well as a device for providing an elevated osmotic pressure and electric power is described.

46 Claims, 4 Drawing Sheets

U.S. PATENT DOCUMENTS

| | | | |
|---|---|---|---|
| 3,906,250 A | | 9/1975 | Loeb |
| 4,193,267 A | | 3/1980 | Loeb |
| RE32,144 E | * | 5/1986 | Keefer ................. 210/637 |
| 4,966,708 A | * | 10/1990 | Oklejas et al. ........... 210/637 |
| 5,037,555 A | | 8/1991 | Pasternak et al. |
| 5,130,025 A | * | 7/1992 | Lefebvre et al. ........... 210/638 |
| 6,313,545 B1 | * | 11/2001 | Finley et al. ............. 290/54 |
| 6,468,430 B1 | * | 10/2002 | Kimura et al. ........... 210/636 |
| 6,540,915 B2 | * | 4/2003 | Patil .................. 210/500.27 |
| 6,568,282 B1 | * | 5/2003 | Ganzi .................. 73/861.42 |

OTHER PUBLICATIONS

Ind. Eng. Chem. Res. 1995, 34, p. 263, Silica-Treated Ceramic Substrates for Formation of Polymer-Ceramic Composite Membranes; Maryam Moaaddeb and William J. Koros, Dept. of Chemical Engineering, The University of Texas, Austin, Texas 78712, downloaded from the internet Mar. 7, 2008.*

M. Mulder, "Basic Principles of Membrane Technology", pp. 224-225 and 303-305.

M. Courel et al., "Modelling of water transport in osmotic distillation using asymmetric membrane", Journal of Membrane Science, vol. 173, pp. 107-122, 2000.

* cited by examiner

SEMI-PERMEABLE MEMBRANE FOR USE IN OSMOSIS AND METHOD AND PLANT FOR PROVIDING ELEVATED PRESSURE BY OSMOSIS TO CREATE POWER

This application is a U.S. national stage of International Application No. PCT/NO01/00314 filed Jul. 20, 2001, which claims the benefit of U.S. Provisional Application No. 60/228,778 filed Aug. 29, 2000.

The present invention concerns an improved semi-permeable membrane for use in osmosis with properties adapted to the object, and/or membrane modules with reduced loss of energy. More detailed the invention concerns a semi-permeable membrane consisting of one thin layer of a non-porous material (the diffusion skin), and one or more layers of a porous material (the porous layer). Further, the invention concerns a method for providing elevated pressure by osmosis (from salt gradients) in a system with pressure retarded osmosis through one or more semi-permeable membranes, which are built up of several layers, whereby at least a part of the elevated osmotic pressure is maintained in the system. A plant for providing an osmotic elevated pressure and electric power is also described.

U.S. Pat. No. 4,283,913 comprises a saturated non-convective water reservoir which captures solar energy and which is used as a separation unit in combination with reverse electro dialysis or pressure retarded osmosis for energy production. From the water reservoir which partly can separate a solution, a higher concentrated stream and a less concentrated stream is passed into two chambers separated with a semi-permeable membrane. Parts of the energy which is created by permeation of the stream with lower concentration through the membrane and the subsequent mixing of the two mentioned streams are transformed into energy before the streams are returned to the water reservoir.

From U.S. Pat. No. 4,193,267 it is known a procedure and an apparatus for the production of power by pressure retarded osmosis, wherein a concentrated solution with high hydraulic pressure is passed along a semi-permeable membrane, and where a diluted solution is passed along the opposite side of said membrane. A portion of the diluted solution is transported through the membrane and creates a pressurized mixed solution. The potential energy stored in this pressurized mixture is converted into applicable energy by pressure release and pressurizing the diluted solution.

In U.S. Pat. No. 3,978,344 a procedure is described for producing energy by pressure retarded osmosis by the use of a turbine and a semi-permeable membrane. Further it is known from U.S. Pat. No. 3,906,250 production of energy by pressure retarded osmosis by hydraulic pressurizing a first liquid which is introduced on one side of a membrane, whereafter another liquid with lower hydraulic pressure and a lower osmotic pressure is introduced on the other side of a membrane. Pressure retarded osmosis will lead to transport of parts of the other liquid through the semi-permeable membrane and thereby a pressurized mixed solution is formed with a larger volume than the first liquid alone. The stored energy is then transformed in a turbine into useable energy such as electric or mechanical power.

For centuries it has been known that when salt water and fresh water are partitioned in two different chambers of a semi-permeable membrane, made for example of a biological membrane, e.g. of hog's bladder, fresh water will press itself through the membrane. The driving force is capable of elevating the salt water level above the level of the fresh water, whereby a potential energy is obtained in the form of a static water height. The phenomenon is called osmosis and belongs to the so-called colligative properties of a solution of a substance in another substance. This phenomenon can be thermodynamically described and the amount of potential energy is therefore known. In a system of fresh water and ordinary sea water the theoretical potential expressed as pressure is approximately 26 bars. The energy potential can in principle be utilized by several technical methods where the energy can be recovered as i.e. steam pressure and stretching of polymers. Two of the technical methods are using semi-permeable membranes, and these are reverse electro dialysis (energy potential as electrical DC voltage) and pressure retarded osmosis, PRO, (energy potential as water pressure).

Calculations have been made to find the costs of energy production at PRO plants. The uncertainty of such calculations is illustrated by the fact that reported values for the energy costs fluctuate over more than a magnitude. Wimmerstedt (1977) indicated a little more than 1 NOK/kWh, whereas Lee et. al. (1981) indicated prohibitive costs. Jellinek and Masuda (1981) indicated costs of less than 0.13 NOK/kWh. Thorsen (1996) made a cost estimate which stated 0.25-0.50 NOK/kWh based on an evaluation of recent data for membrane properties and prices. All of these evaluations are based on the use of fresh water and sea water. Thus, earlier conclusions indicated costs of energy produced by PRO that varied very much. A comprehensive elucidation of methods for energy production today and in the future is included in the book "Renewable Energy" (ed. L. Burnham, 1993) prior to the Rio conference about environment and development. Here salt power is only mentioned very briefly, and it is maintained that the costs are prohibitive.

When fresh water is mixed with salt water there is an energy potential (mixing energy) for PRO corresponding to a downfall of 260 meters for fresh water, and the locations of most interest are rivers flowing into the ocean. In the present invention it has been found that 35-40% of this energy can be recovered by PRO. In a practical power plant the energy will be liberated as water pressure by approximately 10 bars in the stream of brackish water which develops after the fresh and salt water have been mixed together. This pressure can be used for operating conventional turbines. The effective amount of energy will then be between 50 and 100% of the naturally occurring downfall energy in fresh water on world basis.

According to the present invention the actual potential for amounts of power seems to be 25-50% of the water power which today has been developed in Norway. Power plants based on the present invention do not lead to significant emissions into the air or water. Further this form of energy is fully renewable, and is only using natural water as driving force in the same manner as conventional water power plants. The object of the present invention is to make possible commercial utilization of salt power on a bigger scale.

Assumed area expenditure for an intended salt power plant will be relatively small and in the same magnitude as for a gas power plant, and substantially smaller than for wind power. The method is therefore especially friendly to the environment. Briefly the method with regard to the environmental effects and the use properties can be characterised as follows:

no $CO_2$ emissions or other big quantities of emissions other than water renewable, like conventional power from water stable production, unlike the wind and wave power small areas are required, a fact which leads to little influence on the landscape flexible operation suited for small as well as large plants Known art are not dealing with effective semi-permeable membranes with reduced loss of energy where the biggest part of the salt gradient in the membrane is present in the same layer as the flow resistance if the membrane is used for PRO. Therefore an effective and optimised membrane/membrane module has to be developed where the requirement to salt gradient in the membrane and flow resistance as mentioned above are satisfied. This can not satisfactorily be achieved in existing membranes designed for filtering (reverse osmosis). Further a method for production of electric power from osmotic pressure with an effective semi-permeable membrane as mentioned above in a system with PRO where a satisfactory part of the osmotic pressure is maintained, has not been described.

An important feature of the present invention is that most of the salt gradient in the membrane is localized in the same layer—the diffusion skin—as the flow resistance. Further the present patent application also consists of a porous carrier material for the diffusion skin with no resistance worth mentioning against water transport and salt diffusion. This is not satisfactorily achieved in existing membranes designed for filtering (reverse osmosis)/pressure retarded osmosis, PRO. In the present invention salt therefore does not appear in unfavourably high concentrations in parts of the membrane other than the diffusion skin. According to the present invention membranes with particular inner structures are also important. Further the concentration polarization of salt on the sea water side of the membranes is reduced compared to conventional membranes.

In the present PRO plant pressure energy in the brackish water is directly hydraulic recovered for pressurizing incoming sea water. Thereby a part of the loss which ordinarily would occur in an ordinary water pump for this purpose is avoided. By avoiding this loss the PRO plant according to the present invention can be built on ground level instead of below ground level and nevertheless achieve acceptable efficiency.

Recovery of pressure energy by direct hydraulic pressurizing of incoming sea water takes place in a device where the turbine pressure in half of the device is pushing sea water directly into the membrane module. In the other half the brackish water is pushed back and out of the PRO plant as the sea water is pumped in. The mentioned processes which take place in the respective halves of the device for hydraulic pressurizing of sea water alternate by rotation of the water containing part or by a controlled valve system in the mentioned device. The mentioned direct hydraulic pressure transfer leads to that sea water pumps with limited efficiency are no longer necessary.

The present invention describes semi-permeable membranes or membrane modules in which the membranes include a thin diffusion skin with natural osmotic properties, and the rest of the membrane has an increased porosity, so that salt is not collected here (the porous layer).

The present invention comprises a semi-permeable membrane for use in osmosis consisting of one thin layer of a non-porous material acting as diffusion skin, and at least one layer of a porous material, wherein the porous layer has a structure where porosity $\phi$, thickness of the porous layer x (m), and tortuosity $\tau$, stand in relation to each other as indicated by the equation $$x \cdot \tau = \phi \cdot S \qquad \text{Equation (1)}$$

S is a structure parameter having a value equal to or less than 0.0015 meter and can be expressed as $S = x \cdot \tau / \phi$, which is a precise expression for the structure in the porous part of the membrane.

The membrane is suitably configured for pressure retarded osmosis.

As will be appreciated by the average expert in the art, the value of S is for a wetted membrane.

The porous layer of the membrane, when an amount of salt containing water is brought contact with the non-porous material or diffusion skin, has properties related to a salt permeability parameter B (in the diffusion skin) defined by:

$$B = (\phi \cdot D \cdot (dc/dx)/\tau - J \cdot c) \cdot 1/\Delta c_s \qquad \text{Equation (2)}$$

wherein:
A is the water permeability,
B is the salt permeability (m/s),
$\Delta c_s$ is the difference in salt concentration over the diffusion skin (moles/cm$^3$),
$\phi$ is the porosity,
x is the thickness of the porous layer (m),
J is the water flux (m/s),
c is the salt concentration (moles/cm$^3$),
D is the diffusion coefficient of the salt (m$^2$/s),
$\tau$ is the tortuosity, where the efficiency of the membrane in pressure retarded osmosis for a given value of a water permeability, A (m/s/Pa), can be expressed by an integration of Equation (2) to yield:

$$\Delta c_s/c_b = \exp(-d_s \cdot J/D)/\{1 + B \cdot [(\exp(d_f J/D + S \cdot J/D) - \exp(-d_s \cdot J/D)]/J\} \qquad \text{Equation (3)}$$

wherein:
$c_b$ is the concentration of salt water salt minus the concentration of salt in the fresh water (moles/cm$^3$),
$d_f$ and $d_s$ are the thickness of the diffusion films (concentration polarizing) on the fresh water side and salt water side, respectively, of the membrane ($\mu$m),
$\Delta c_s/c_b$ expresses the efficiency of the membranes in pressure retarded osmosis for a given value of the water permeability.

The value of the structure parameter S and thereby the inner structure of the membrane is decisive for its efficiency in pressure retarded osmosis. The structure should have only one thin and non-porous layer wherein salt has considerably lower diffusion velocity than water. The other layers must all be porous so that salt and water can be transported with as little resistance as possible. Usually several porous layers are present to give the membrane the correct mechanical properties and/or as a result of the production method. In those cases where the diffusion skin lies between two or more porous layers, or the membrane is laterally reversed in relation to fresh water and salt water, the expressions will be more complicated, but the following discussion will be valid in the same manner.

The structure parameter S should have a value of 0.0015 meter or lower. The thickness of the membrane is less than 150 $\mu$m, preferably less than 100 $\mu$m. The average value for porosity, $\phi$, in the porous layer in the present invention is more than 50%. The semi-permeable membrane has a tortuosity, $\tau$, which is less than 2.5. The permeability for salt, B, is less than $3 \cdot 10^{-8}$ m/s, and the water permeability, A, is more than $1 \cdot 10^{-11}$ m/s/Pa. The thickness of the diffusion film on the side containing lesser salt and the side containing more salt is less than 60 $\mu$m, preferably less than 30 $\mu$m.

Membrane modules according to the present invention comprise flow breakers consisting of threads of polymers which are forming a net with a square or rhombic pattern. Further several membranes are packed together to modules (rolled up to spiral membranes) where the distance between adjacent membranes are from 0.4 to 0.8 mm.

The present invention further concerns a method where an elevated pressure is provided by osmosis (from salt gradients) in a system with pressure retarded osmosis through one or more semi-permeable membranes, which are built up of several layers, where at least one part of the osmotic pressure is maintained in the system. The method includes contacting a salt containing feed stream with a non-porous layer (the diffusion skin) in one or more semi-permeable membranes; where at the same time a feed stream containing less salt is brought in contact with the other side of the diffusion skin, and where an adjacent porous layer (the porous layer) in one or more of the mentioned semi-permeable membranes has a structure where the porosity $\phi$, the thickness of the porous layer x (m), and the tortuosity $\tau$, are related to one another as indicated by the expression $$x \cdot \tau = \phi \cdot S$$

wherein S is a structure parameter which is equal to or less than 0.0015 meter, whereby water ($H_2O$) from the stream containing less salt naturally is driven through the semi-permeable membrane by osmosis and creates an osmotic hydraulic elevated pressure on the permeate side.

In the stated method at least a part of the potential osmotic pressure between the two water streams is hydraulic transferred directly to the incoming salt containing feed stream. The amount of the salt containing feed stream is 1-3 times higher than the amount of the feed stream containing less salt, so that the ratio between the length of a flow path of the salt containing and the less salt containing stream is from 0.3 to 1.0. The distance between adjacent membranes is from 0.4 to 0.8 mm.

In the spiral modules the channels for the salt containing feed stream are 10-50% filled with one or more flow breaking devices consisting of threads of polymer which form a net with square or rhombic pattern.

The pressure in the salt containing feed stream on the membrane/membrane modules is in the area from 6-16 bars.

As an alternative to spiral membranes parallel fibres can be placed in layers between successive streams of a less salt containing feed stream and a salt containing feed stream. The above mentioned will then be a little altered, but the pressure will be the same.

The invention concerns in addition a plant wherein an elevated osmotic pressure is provided, and where the plant comprises one or more semi-permeable membranes or membrane modules where the membranes comprise a non-porous layer (the diffusion skin) and at least one porous layer; and an arrangement for direct hydraulic transmission of an osmotic pressure.

Further referred to is also a plant for providing elevated osmotic pressure, suitably for the purpose of generating electric power. The plant includes one or more semi-permeable membranes or membrane modules where the membranes comprise a non-porous layer (the diffusion skin) and at least one porous layer; and an arrangement for direct hydraulic transmission of an osmotic pressure, and at least a turbine with electric generator.

The plant can be placed on the ground, or below the surface of the earth down to a level not below 200 meters.

Pressure retarded osmosis is like all osmotic processes based on selective mass transport through membranes. A chamber with fresh water is separated from a chamber with sea water by a semi-permeable membrane. This membrane allows transport of water, but not of salt.

Both water and salt will diffuse from high to low concentration, but the membrane prevents the transport of salt. The result is a net water transport from the fresh water side to the sea water side, and a pressure is building up on the sea water side. Thus the osmotic water transport is retarded by the building up of pressure. Water which has been transported to the sea water side is there at a higher pressure, and work can be extracted if the water is allowed to flow out through a turbine. In this way the free energy by mixing fresh water and sea water can be converted to work.

If fresh water is flowing into the sea water side without anything flowing out, the pressure will build up. Finally, the pressure on the sea water side will be so high that the transport of water comes to a stop. This happens when the difference in pressure equals the osmotic pressure of sea water given by van't Hoff's equation:

$$P_{osmotic} = 2RTC_{NaCl} \qquad \text{Equation (4)}$$

Here R is the gas constant and T is absolute temperature. For a 35 g/l NaCl solution equation (4) gives a theoretical osmotic pressure of 29 bars at 20° C. This corresponds to a water column of 296 meters. If one mole water (0.018 kilos) is lifted 296 meters, a work of 52.2 J has to be carried out.

In a power plant based on pressure retarded osmosis fresh water, being feed into the low pressure side, is transported by osmosis through the semi-permeable membrane to the high pressure side. From the high pressure side the water is pressure released through a turbine which generates mechanical power. To keep a necessary high salt concentration on the sea water side, sea water has to be pumped in against the working pressure. Net energy is produced because the volume stream which is expanding (fresh water+sea water) is larger than the volume stream which is compressed. Some of the fresh water is leaving the plant from the low pressure side, and provides for the transport of contaminations away from the fresh water and possible salt which has leaked out from the high pressure side.

Another possible design of a plant for pressure retarded osmosis is to build the plant buried 0-200 m, suitably 50-150 m, most preferably 120 m below ground level. In this case fresh water is passed through pipelines downwards to the turbines, and from there into the low pressure side of the membranes. Sea water is passed into the high pressure side of the membranes which has been pressurized by hydrostatic power, and the sea water can circulate through the high pressure side with friction as the only loss. The fresh water will be transported through the membrane driven by the osmotic power, and leaves the plant mixed with sea water. The membranes can then be positioned as land based modules buried under ground level together with the turbines and other equipment. If the sea is more deep-set than the excavation the membrane modules could be placed directly in the sea.

The skin of the membrane can possibly be located either against the sea water or the fresh water. Locating the diffusion skin against the fresh water side will have the advantage that the contaminations in the fresh water being more readily rejected on the membrane surface because the diffusion skin has far smaller pores in comparison with the porous carrier. Since there is a net volume stream moving in towards the membrane on the fresh water side, this volume stream will be able to transport different types of impurities which can lead to fouling of the membrane. On the other hand, a continuous water stream from the membrane on the water side will contribute to keeping the surface of the membrane clean.

Because all of the pressure difference in the present process lies over the non-porous material (the diffusion skin), it can be an advantage that the diffusion skin lies on the sea water side since the overpressure will press the diffusion skin against the carrier. With the diffusion skin on the fresh water side there is a risk that the diffusion skin is loosened from the carrier, and the membrane can be destroyed.

Further, the parameters for the water permeability, A, and the salt permeability, B, are of high importance as to the performance of the membrane.

For a membrane which is totally without salt leakage, the thickness, porosity and tortuosity of the carrier will not be of great importance to the energy production.

It seems to be a considerable dependence on film thickness due to concentration polarization on the sea water side alone, as concentration polarisation on the fresh water side is fully negligible for a membrane with a small salt leakage.

The thickness of this diffusion film is a critical size for the energy production by pressure retarded osmosis. This size has to be determined experimentally from transport trials where flux data are adapted to the actual model. Theoretical calculations with a more complex transport model indicate a thickness of the diffusion film of approximately 0.000025 m.

The thickness of the diffusion film on the surface of the membrane against the sea water side can be reduced by increasing the flow velocity on the sea water side, and by the use of devices which increase the stirring of the flowing sea water (turbulence promoters). Such efforts will increase the loss by friction during the flow of the sea water, and there will be an optimum point with regard to the sea water rate through a membrane module and the shaping of the membrane module.

As mentioned above, the concentration polarization of salt will be a small problem on the fresh water side in a good membrane module. This is a great advantage since the fresh water rate has to be low in parts of a good device as most of the fresh water is to be transported through the membrane and over to the sea water.

By pressure retarded osmosis the most important members of loss will be in connection with pressurizing sea water, pumping water through the membrane module and loss by conversion of pressure energy in water into electric energy by means of turbine and generator.

Because of friction loss a drop in pressure will develop over the membrane module. The water must be pumped through a narrow channel which is provided with a distance net to keep the required width of the channel, and which at the same time can promote mixing of the water phase. Thus the thickness of the diffusion film can be reduced, and the efficiency in the PRO process can be improved.

In PRO processes with a good membrane module concentration polarization will only be an essential problem on the sea water side, since the salt concentration on the fresh water side only shows a low increase. Further, the rate on the sea water side will be higher than on the fresh water side, because fresh water is transported over to the sea water, and also because there exists a desire to maintain the highest possible salt concentration in the sea water. The last mentioned is achieved by having a high through flow of salt water, but the profit of a high salt water rate has to be considered against the expenses. The rate of the salt water can be increased by recycling of salt water.

In a process according to the present invention sea water is pressurized before it flows through the membrane module. Then the sea water together with the fresh water which has been transported through the membrane, will expand through a turbine. The pump as well as the turbine will have an efficiency of less than 1, and energy will consequently be lost in these unity operations.

To reduce the loss when large quantities of sea water first have to be compressed, and then expanded through a turbine, pressure exchange can be used. In pressure exchange the pressure in outgoing diluted sea water is used to compress incoming sea water. Only a quantity of water corresponding to the fresh water which flows through the membrane will pass through the turbine, and a far smaller turbine can therefore be used. The high pressure pump for pressurizing the sea water is completely eliminated.

Finally the invention describes a plant for the production of electric power, where the plant comprises water filters for purifying a salt containing feed stream and a feed stream containing less salt, one or more semi-permeable membranes or membrane modules, as well as an arrangement for direct hydraulic transmission of an osmotic pressure.

FIG. 1 describes a PRO plant wherein fresh water as well as sea water is fed into separate water filters prior to the streams are passing by one another on each side of a semi-permeable membrane. A portion of the mixture of permeate and salt water with elevated pressure is passed to a turbine for the production of electric power. The balance of the permeate stream is passed to a pressure exchanger where incoming sea water is pressurized. The pressurized sea water is then fed into the membrane module.

Figure 5:
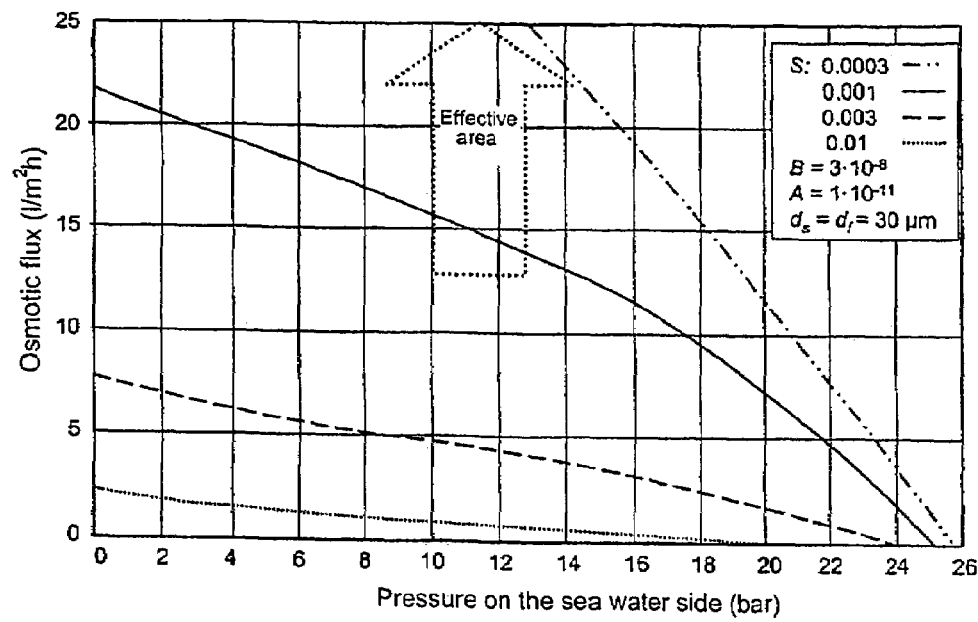

FIG. 5 shows the relation between pressure on the one side of the membrane which is in contact with a quantity salt containing water (the sea water side), and osmotic flux. FIG. 5 shows the values S which are acceptable for economical power production when A is $10^{-11}$ m/s/Pa and B is $3 \cdot 10^{-8}$ m/s. This or higher values of A are considered as necessary. Consequently S must have a value of 0.001 m or lower. Laboratory measurements have shown that the membranes intended for reverse osmosis; which gives the best performance in pressure retarded osmosis, have S-values around 0.003 m. This means that S has to be improved with a factor of 3 or better in relation to these membranes. Lower values of B will to some extent modify the requirement for S.

Figure 6:
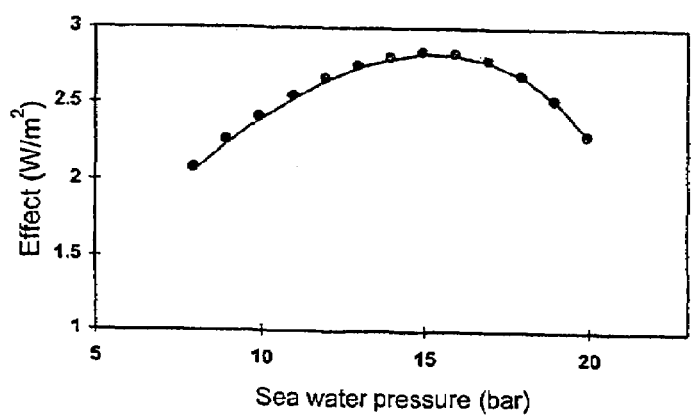

FIG. 6 shows effect as function of pressure on the sea water side for a process with conditions as given in table 2.

Figure 7:
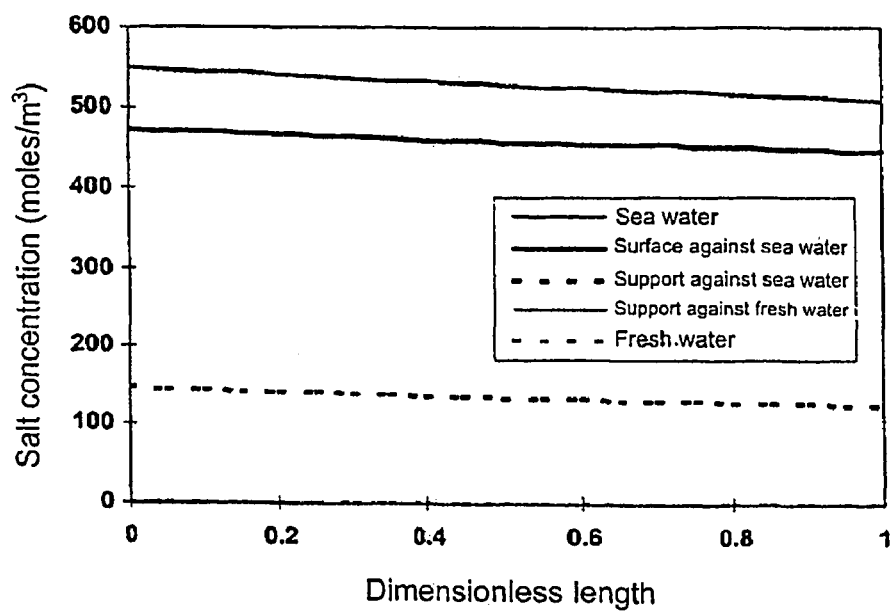

FIG. 7 shows concentration relations along membrane for PRO with conditions as given in table 2 (the salt concentrations on the fresh water side are hardly visible).

Figure 8:
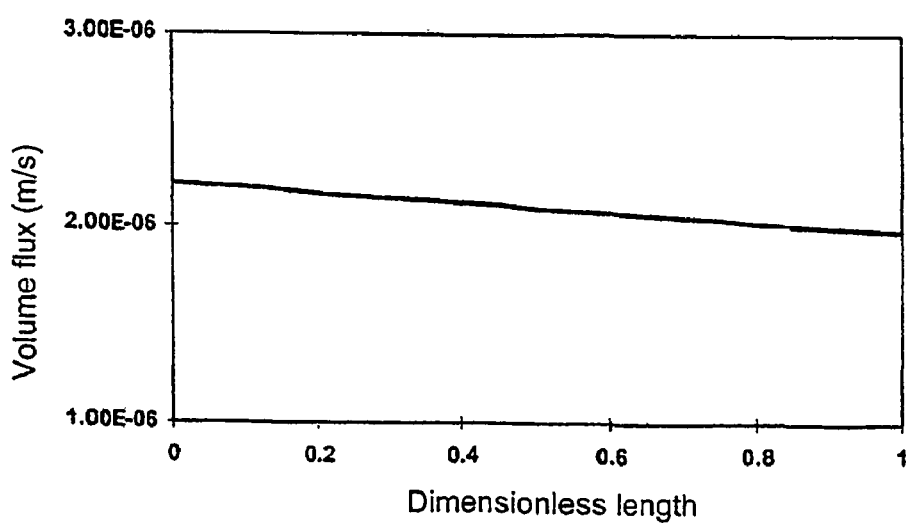

FIG. 8 shows volume flux of water through the membrane for a process with conditions given in table 2.

The necessary values for the salt permeability, B, the water permeability, A, the structure parameter, S, and the thickness of the diffusion films will also apply to possible fiber membranes. A principal drawing for fibre membranes will be as for spirals with exception of that which concerns the use of flow breaking distance nets.

Examples of Energy Production:

The mixing zone for salt water and fresh water can be considered as adiabatic, i.e. there is no heat exchange (dq=0) with the surroundings. Since the mixing enthalpy is approximately zero, and work (dw), but not heat, is extracted from the mixture, it is obtained from the energy preservation law:

$$dEc_p dT = dq + dw = dw \qquad \text{Equation (5)}$$

wherein dE is the change in the inner energy of the total system and $c_p$ is the heat capacity of the system.

Extraction of work will according to equation (5) lead to a certain of cooling. If one mole of fresh water with 52,5 J/mole is reversibly mixed with three moles of salt water, the diluted salt water will be cooled down with 0.17° C. In a real process optimised for energy production per mixing unit, half of the reversible work will be taken out. This leads to a cooling of the mixture of less than 0.1° C.

As mentioned above, only 50% of the possible mixing free energy will be utilized in a practical device to maximize the energy production. Further, energy will be lost by operation of the process. With the assumption that 20% of the energy which is produced in the mixing unit is lost in the process (loss because of friction, operation of pumps, turbines, etc.) about 20 J per mole of fresh water which passes through the process could be produced. This causes an energy production for some locations based on mean flow of water transport according to the present invention as illustrated in table 1.

TABLE 1

Examples of possible power plants based on average water flow

| Example of rivers | Water flow (m³/s) | Power production (MW) |
| --- | --- | --- |
| Small local river | 10 | 10 |
| Namsen (Norway) | 290 | 300 |
| Glomma (Norway) | 720 | 750 |
| Rhine (Germany) | 2 200 | 2 400 |
| Mississippi (USA) | 18 000 | 19 000 |

Examples of Operating Variables:

For calculation of water and salt transport through the membrane as well as energy production per area unit of membrane, it is necessary to have real values of the different parameters which describe the actual membrane, the shape of the membrane module, parameters describing the process conditions, as well as some physical data. Necessary parameters for the calculations are summarized in table 2.

All calculations in the following are carried out on the basis of 1 m² membrane area. Because the water and salt fluxes through the membrane in most cases are considerable in relation to the incoming rates of salt water and fresh water, the concentrations, and therefore also the fluxes through the membrane, will vary along the membrane. To allow for this the membrane is divided into 20 cells of equal size for calculation purposes. The concentrations and rates of salt water and fresh water, respectively, to the first cell, and the sea water pressure on the membrane, are given by the input conditions, see table 2. The fluxes of water and salt for these conditions are then calculated iteratively from cell to cell by means of the necessary equations.

The salt water rate, Q, out from the last cell, defines the rate out of the process. The difference between out-rate and in-rate for salt water, and the pressure on the salt water side indicates the produced work. The exploitation ratio of fresh water is indicated by the difference between fresh water rate in and out in relation to fresh water rate in.

TABLE 2

Necessary parameters for model calculations of pressure retarded osmosis.

| Symbol | Unit | Example value | Parameter |
| --- | --- | --- | --- |
| A | m/Pa/s | $10^{-11}$ | Water permeability in the membrane |
| B | m/s | $10^{-8}$ | Salt permeability through the membrane |
| x | m | 0.0005 | Thickness of the porous layer |
| $\phi$ | | 0.5 | Porosity in porous layer |
| $\tau$ | | 1.5 | Tortuosity in porous layer |
| $d_{sjø}$ | m | 0.00005 | Thickness of diffusion film on the sea water side |
| $d_f$ | m | 0.00005 | Thickness of diffusion film on the fresh water side |
| T | ° C. | 3 | Process (water) temperature |
| $p_{sjø}$ | Pa | $13 \cdot 10^5$ | Pressure on the sea water side |
| $c_{sjø}^{inn}$ | mol/m³ | 549 | Incoming concentration of salt in salt water |
| $c_f^{inn}$ | mol/m³ | 0 | Incoming concentration of salt in fresh water |
| $Q_{inn}$ | m³/s | $9 \cdot 10^{-6}$ | Volume rate of fresh water in on the membrane |
| F | | 3 | Feed ratio between salt water and fresh water |
| $D_s$ | m²/s | $7.5 \cdot 10^{-10}$ | Coefficient of diffusion for salt (NaCl) |
| S | m | $\leq 0.0015$ | Structure parameter |

For each single set of parameters fluxes and rates are calculated as stated above. For determination of optimal sea water pressure the sea water pressure is always varied with other conditions constant.

In the calculations pressure loss through the membrane module because of the flow resistance has not been considered. Neither has the efficiency of the pump which pressurizes the sea water and the turbine which produces energy from the process been considered. Produced work as presented is therefore related to the energy production during the mixing process, and is not equal to the real work that can be extracted from a real process. Such dimensions has to be estimated for the plants in question.

Figure 1:
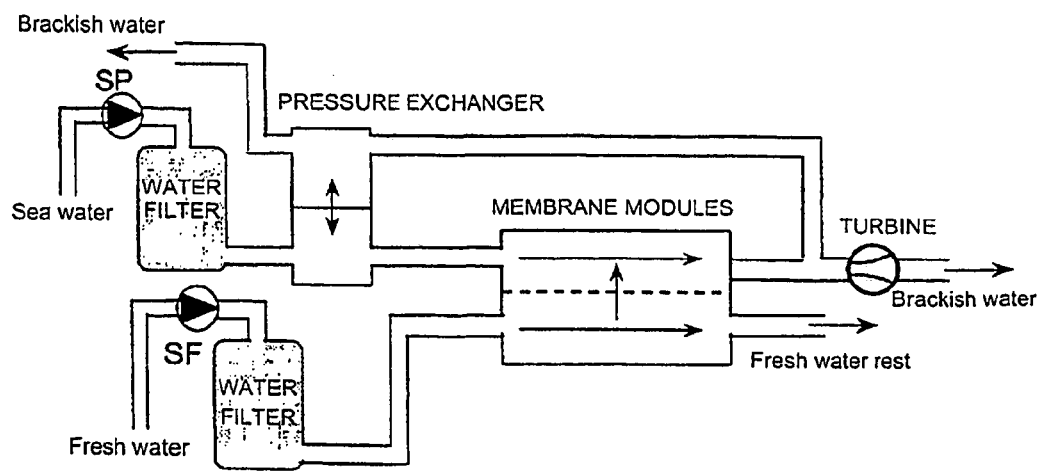
Figure 2:
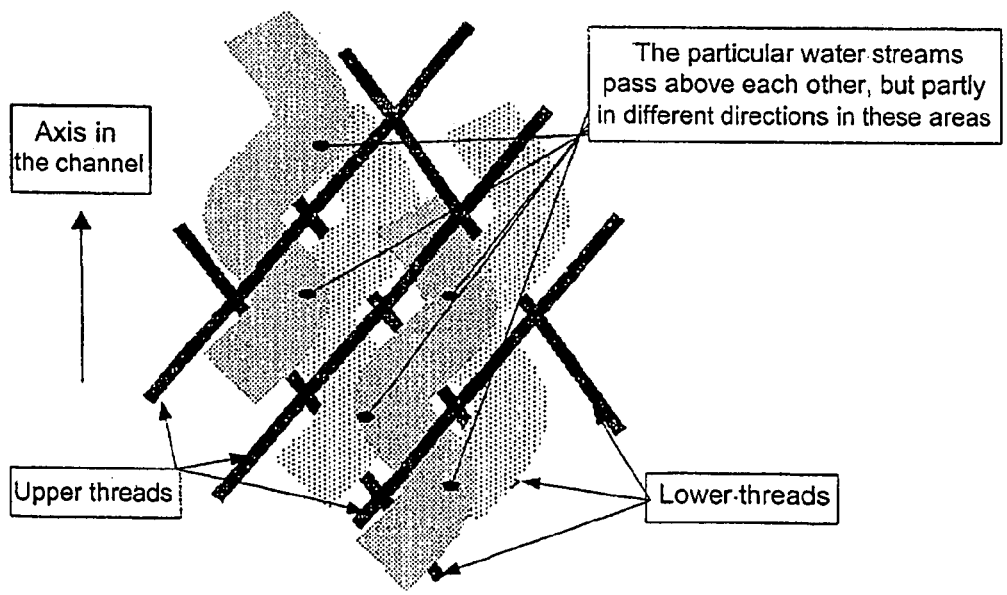
FIG. 2 shows the stream pattern for cross-stream in a spiral module.
Figure 3:
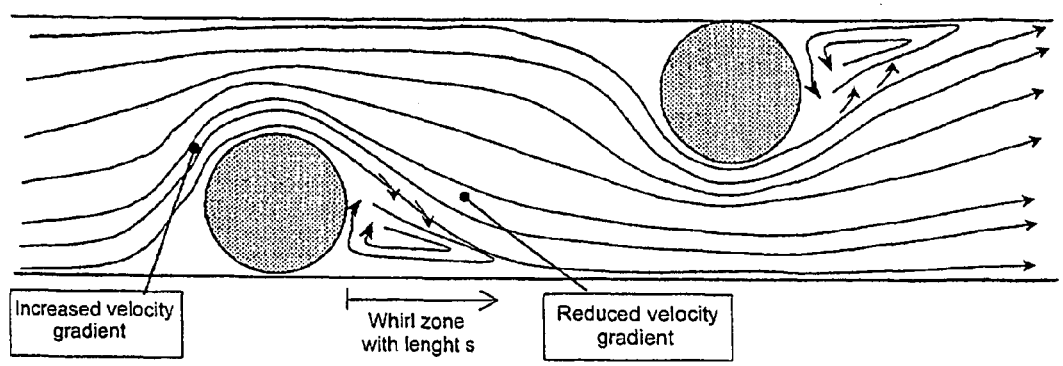
FIG. 3 shows stream lines in a spiral module.
Figure 4:
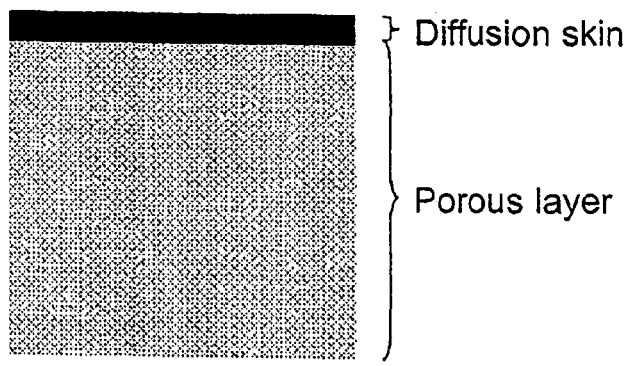
FIG. 4 shows the build-up of the interior structure of a membrane, a non-porous layer, called diffusion skin, and one porous layer.

The coefficient of diffusion for salt is increasing with approximately 80% when the temperature increases from 3 to 20° C., but do not change much with the concentration of salt. The coefficient of diffusion at 0.1 moles/l is therefore used in all calculations. As an example of calculations a basis point has been taken in the conservative parameter values stated in table 2. At these conditions the membrane produces 2.74 W/m², and 23% of the fresh water which is supplied to the membrane is transported over to the sea water side. FIG. 1 shows the effect per area unit of membrane as a function of the pressure on the sea water side. As shown on the figure the effect has a relatively flat optimum area between 13 and 18 bars. By selecting a little more favourable values for the membrane thickness, film thickness and temperature, the energy production can easily be higher than 5 W/m².

The concentrations over the membrane from the inlet side and to the outlet are shown on FIG. 7 for a sea water pressure of 13 bars. Because the salt leakage through this membrane is small in this example, the increase of the salt concentration on the fresh water side is hardly noticeable, and reaches a discharge concentration of 0.5 moles/m³. Correspondingly the concentration polarization on the fresh water side can be fully neglected.

On the other hand, the concentration polarization on the sea water side is considerable, and gives a concentration drop just below 100 moles/m³. Correspondingly there is a concentration drop of almost 150 moles/m³ over the carrier. The driving concentration difference over the skin of the membrane corresponds to the concentration difference between the surface of the skin against the sea water and the side of the adjacent porous layer which faces against the sea water, see FIG. 7, and amounts to approximately 320 moles/m³, or barely 60% of the concentration difference between sea water and fresh water. This illustrates the importance of reducing the polarization effects. This is achieved by minimizing the thickness of the diffusion film on the sea water side (high flow velocity and good stirring), and the thickness of the carrier.

FIG. 8 shows the volume flux of water through the membrane as a function of dimensionless position from the inlet side. As the figure shows, the water flux changes relatively little, and the reason for this is that the driving concentration difference also is relatively constant along the membrane, see FIG. 7.

The invention claimed is:

1. A plant for providing elevated osmotic pressure through use of pressure retarded osmosis, wherein the plant comprises at least one semipermeable membrane or membrane module where the membrane or membrane module comprises a non-porous material as a diffusion skin, and at least one layer of a porous material, wherein the porous layer has, when water wetted, a porosity $\phi$, thickness x, and tortuosity $\tau$ related to one another as given by the expression:

$$x \cdot \tau = \phi \cdot S \quad \text{Equation (1)}$$

wherein S has a value of 0.0015 meter or lower,
the porosity $\phi$ has an average value of more than 50%,
the tortuosity $\tau$ is less than 2.5,
a water permeability of the porous layer is greater than $1 \times 10^{-11}$ m/s/Pa, and
a salt permeability of the porous layer is less than $3 \times 10^{-8}$ m/s, and
a pressure exchange arrangement connected to an outlet of the membrane or membrane module configured to receive direct hydraulic transfer of osmotic pressure at elevated pressure branched off therefrom to provide increased pressure to water delivered to an inlet of the membrane or membrane module at a diffusion skin side.

2. The plant according to claim 1, wherein the porous layer of the membrane, when a first water feed stream containing salt is contacted with the diffusion skin, has properties related to a salt permeability parameter B defined by:

$$B = (\phi \cdot D \cdot (dc/dx)/\tau - Jc) \cdot 1/\Delta c_s \quad \text{Equation (2)}$$

wherein:
A is the water permeability and is greater than $1 \times 10^{-11}$ m/s/Pa,
B is the salt permeability (m/s) and is less than $3 \times 10^{-8}$ m/s,
$\Delta c_s$ is the salt concentration difference over the diffusion skin (moles/cm³),
$\phi$ is the porosity and has an average value of more than 50%,
x is the thickness of the porous layer (m),
J is the water flux (m/s),
C is the salt concentration (moles/cm³),
D is the diffusion coefficient of the salt (m²/s),
$\tau$ is the tortuosity and is less than 2.5, where the efficiency of the membrane in pressure retarded osmosis for a given value of a water permeability, A(m/s/Pa), can be expressed by an integration of Equation (2) to yield:

$$\Delta c_s/c_b = \exp(-d_s \cdot J/D)/\{1 + B \cdot [(\exp(d_f \cdot J/D + S \cdot J/D) - \exp(-d_s \cdot J/D)]/J\}$$

wherein:
$c_b$ is the difference in salt concentration between a second water feed stream and the first water feed stream, wherein said second water feed stream contains less salt than said first water feed stream (moles/cm³), $d_f$ and $d_s$ are the thickness (μm) of the diffusion films on a side of the membrane contacting the second water feed stream and a side of the membrane contacting the first water feed stream, respectively, and
$\Delta c_s/c_b$ is the efficiency of the membrane in pressure retarded osmosis for a given value of the water permeability.

3. The plant according to claim 1, wherein at least one power providing turbine is located downstream of a location where said pressure transfer is branched off from the outlet.

4. The plant according to claim 1, wherein the osmotic hydraulic elevated pressure is applied to at least one turbine which is used for creating electric power.

5. The plant according to claim 1, wherein the membrane has a thickness which is less than 150 μm.

6. The plant according to claim 5, which is operably linked to at least one turbine and wherein the membrane or membrane module is configured to provide elevated osmotic pressure to drive the at least one turbine.

7. The plant according to claim 6, wherein the at least one turbine is used for creating electric power.

8. The plant according to claim 1, wherein the diffusion skin side is configured to be contacted with a first water feed stream and the porous layer of the membrane is configured to be contacted with a second water feed stream, the second water feed stream having less salt content than the first water stream, and wherein the first water stream is at a pressure higher than that of the second water stream.

9. The plant according to claim 8, wherein the water delivered at the diffusion skin side of the membrane is pressurized water in the range of 6-16 bar.

10. The plant according to claim 9, wherein the water delivered at the diffusion skin side of the membrane is pressurized water at 13 bar.

11. The plant according to claim 1, which is operably linked to at least one turbine and wherein the membrane or membrane module is configured to provide elevated osmotic pressure to drive the at least one turbine.

12. The plant according to claim 11, wherein the at least one turbine is used for creating electric power.

13. The plant according to claim 1, wherein the water delivered at the diffusion skin side of the membrane is pressurized water in the range of 6-16 bar.

14. The plant according to claim 13, wherein the water delivered at the diffusion skin side of the membrane is pressurized water at 13 bar.

15. A plant for providing an elevated osmotic pressure through use of pressure retarded osmosis, wherein the plant comprises at least one semi-permeable membrane or membrane module where the membrane or membrane module comprises a non-porous material as a diffusion skin, and at least one layer of a porous material forming a porous layer which, when water wetted, has a porosity $\phi$, thickness x, and tortuosity $\tau$ related to one another as given by the expression:

$$x \cdot \tau = \phi \cdot S \quad \text{Equation (1)}$$

wherein S has a value of 0.0015 meter or lower,
the porosity φ has an average value of more than 50%,
the tortuosity τ is less than 2.5,
a water permeability of the porous layer is greater than $1 \times 10^{-11}$ m/s/Pa, and
a salt permeability of the porous layer is less than $3 \times 10^{-8}$ m/s, and
at least one power providing turbine operably linked with the membrane or membrane module.

16. The plant according to claim 15, wherein the porous layer of the membrane, when a first water feed stream containing salt is contacted with the diffusion skin, has properties related to a salt permeability parameter B defined by:

$$B = (\phi \cdot D \cdot (dc/dx)/\tau - Jc) \cdot 1/\Delta c_s \qquad \text{Equation (2)}$$

wherein:
A is the water permeability and is greater than $1 \times 10^{-11}$ m/s/Pa,
B is the salt permeability (m/s) and is less than $3 \times 10^{-8}$ m/s,
$\Delta c_s$ is the salt concentration difference over the diffusion skin (moles/cm$_3$),
φ is the porosity and has an average value of more than 50%,
x is the thickness of the porous layer (m),
J is the water flux (m/s),
C is the salt concentration (moles/cm$_3$),
D is the diffusion coefficient of the salt (m$_2$/s),
τ is the tortuosity and is less than 2.5,
where the efficiency of the membrane in pressure retarded osmosis for a given value of a water permeability, A(m/s/Pa), can be expressed by an integration of (2):

$$\Delta c_s/c_b = \exp(-d_s \cdot J/D)/\{1 + B \cdot [(\exp(d_f \cdot J/D + S \cdot J/D) - \exp(-d_s \cdot J/D)]/J\}$$

wherein:
$c_b$ is the difference in salt concentration between a second water feed stream and the first water feed stream, wherein said second water feed stream contains less salt than said first water feed stream (moles/cm$_3$),
$d_f$ and $d_s$ are the thickness (μm) of the diffusion films on a side of the membrane contacting the second water feed stream and a side of the membrane contacting the first water feed stream, respectively, and
$\Delta c_s/c_b$ is the efficiency of the membrane in pressure retarded osmosis for a given value of the water permeability.

17. The plant according to claim 15,
wherein the plant is located 0-200 m below ground level,
wherein fresh water is passed through pipelines downwards to at least one turbine,
wherein the fresh water is further passed from the turbine into a low pressure side of at least one membrane or membrane module,
wherein sea water is passed into a high pressure side of said at least one membrane or membrane module, said sea water having been pressurized by hydrostatic power, wherein the sea water is allowed to circulate through said high pressure side of said at least one membrane or membrane module,
wherein the fresh water is transported through said at least one membrane or membrane module by osmotic power, and
wherein water leaving the plant is the fresh water mixed with the sea water.

18. The plant according to claim 17, wherein the water delivered at the diffusion skin side of the membrane is pressurized water in the range of 6-16 bar.

19. The plant according to claim 18, wherein the water delivered at the diffusion skin side of the membrane is pressurized water at 13 bar.

20. The plant according to claim 15, wherein said at least one turbine is used for creating electric power.

21. The plant according to claim 15, wherein the membrane has a thickness which is less than 150 μm.

22. The plant according to claim 15, wherein a diffusion skin side of the membrane or membrane module is configured to be contacted with a first water feed stream and the porous layer of the membrane is configured to be contacted with a second water feed stream, the second water feed stream having less salt content than the first water stream, and wherein the first water stream is at a pressure higher than that of the second water stream.

23. The plant according to claim 22, wherein the water delivered at the diffusion skin side of the membrane is pressurized water in the range of 6-16 bar.

24. The plant according to claim 23, wherein the water delivered at the diffusion skin side of the membrane is pressurized water at 13 bar.

25. A plant for providing elevated osmotic pressure through use of pressure retarded osmosis, wherein the plant comprises at least one semi-permeable membrane or membrane module where the membrane or membrane module comprises a non-porous material as a diffusion skin, and at least one layer of a porous material, wherein the porous layer has, when water wetted, a porosity φ, thickness x, and tortuosity τ related to one another as given by the expression:

$$x \cdot \tau = \phi \cdot S \qquad \text{Equation (1)}$$

wherein S has a value of 0.0015 meter or lower,
the porosity, φ, has an average value of more than 50%,
the tortuosity, τ, is less than 2.5,
a water permeability of the porous layer is greater than $1 \times 10^{-11}$ m/s/Pa, and
a salt permeability of the porous layer is less than $3 \times 10^{-8}$ m/s, and
the membrane has a thickness which is less than 150 μm,
a pressure exchange arrangement connected to an outlet of the membrane or membrane module configured to receive direct hydraulic transfer of osmotic pressure at elevated pressure branched off therefrom to provide increased pressure to water delivered to an inlet of the membrane or membrane module at a diffusion skin side,
wherein the diffusion skin side is configured to be contacted with a first water feed stream and the porous layer of the membrane is configured to be contacted with a second water feed stream, the second water feed stream having less salt content than the first water stream, and wherein the first water stream is at a pressure higher than that of the second water stream, and at least one power providing turbine is located downstream of a location where said pressure transfer is branched off from the outlet, and the osmotic hydraulic elevated pressure is applied to the at least one turbine which is used for creating electric power.

26. The plant according to claim 25, wherein the first water stream is pressurized water in the range of 6-16 bar.

27. The plant according to claim 26, wherein the first water stream is pressurized water at 13 bar.

28. A plant for providing an elevated osmotic pressure through use of pressure retarded osmosis, wherein the plant comprises at least one semi-permeable membrane or membrane module where the membrane or membrane module comprises a non-porous material as a diffusion skin, and at least one layer of a porous material forming a porous layer which, when water wetted, has a porosity $\phi$, thickness x, and tortuosity $\tau$ related to one another as given by the expression:

$$x \cdot \tau = \phi \cdot S \qquad \text{Equation (1)}$$

wherein S has a value of 0.0015 meter or lower,
the porosity, $\phi$, has an average value of more than 50%,
the tortuosity, $\tau$, is less than 2.5,
a water permeability of the porous layer is greater than $1 \times 10^{-11}$ m/s/Pa, and
a salt permeability of the porous layer is less than $3 \times 10^{-8}$ m/s, and
the membrane has a thickness which is less than 150 µm,
wherein a diffusion skin side of the membrane or membrane module is configured to be contacted with a first water feed stream and the porous layer of the membrane is configured to be contacted with a second water feed stream, the second water feed stream having less salt content than the first water stream, and wherein the first water stream is at a pressure higher than that of the second water stream, and
at least one power providing turbine operably linked with the membrane or membrane module is used for creating electric power.

29. The plant according to claim 28, wherein the first water feed stream is pressurized water in the range of 6-16 bar.

30. The plant according to claim 29, wherein the first water feed stream is pressurized water at 13 bar.

31. A plant for providing elevated osmotic pressure through use of pressure retarded osmosis, wherein the plant comprises at least one semipermeable membrane or membrane module where the membrane or membrane module comprises a non-porous material as a diffusion skin, and at least one layer of a porous material, wherein the porous layer has, when water wetted, a porosity $\phi$, thickness x, and tortuosity $\tau$ related to one another as given by the expression:

$$x \cdot \tau = \phi \cdot S \qquad \text{Equation (1)}$$

wherein S has a value of 0.0015 meter or lower,
the porosity, $\phi$, has an average value of more than 50%,
the tortuosity, $\tau$, is less than 2.5,
a water permeability of the porous layer is greater than $1 \times 10^{-11}$ m/s/Pa, and
a salt permeability of the porous layer is less than $3 \times 10^{-8}$ m/s,
the membrane has a thickness which is less than 150 µm,
an inlet of a first water feed stream for delivery to the non-porous material side of the membrane or membrane module and an inlet of a second water stream for delivery to the porous layer side of the membrane or membrane module, the second water feed stream containing less salt than the first water feed stream and having less pressure than the first water feed stream, and an outlet from the membrane or membrane module on the non-porous side thereof for delivery of a combination of a part of the second water feed stream having passed through the membrane mixed with the first water feed stream, connected to at least one turbine for creating said electric power.

32. The plant according to claim 31, wherein the first water feed stream is pressurized water in the range of 6-16 bar.

33. The plant according to claim 32, wherein the first water feed stream is pressurized water at 13 bar.

34. A semi-permeable membrane for forward osmosis or pressure retarded osmosis, the membrane comprising one thin layer of a non-porous material as a diffusion skin, and at least one layer of a porous material, wherein the porous layer has, when water wetted, a porosity $\phi$, thickness x(l/c), and tortuosity $\tau$ in relation to one another as given by $$x \cdot \tau = \phi \cdot S \qquad \text{Equation (1)}$$

where S has a value of 0.0015 meter or lower,
the porosity $\phi$ has an average value of more than 50%,
the tortuosity $\tau$ is less than 2.5,
a water permeability of the porous layer is greater than $1 \times 10^{-11}$ m/s/Pa, and
a salt permeability of the porous layer is less than $3 \times 10^{-8}$ m/s,
wherein said membrane is used to form a set of several membranes with flow breakers located between the membranes of the set of membranes, said flow breakers consisting of threads of polymer which form a net with square or rhombic pattern.

35. The membrane according to claim 34, wherein the membrane has a thickness of less than 150 µm.

36. The membrane according to claim 34, wherein the membrane has a thickness of less than 100 µm.

37. The membrane according to claim 34, wherein said several membranes have been packed together in layers to form modules where the distance between adjacent membranes is from 0.4 to 0.8 mm.

38. The membrane according to claim 34, wherein the porous layer of the membrane comprises hollow fibers with an outside diameter from 0.05 to 0.5 mm.

39. A semi-permeable membrane for pressure retarded osmosis, the membrane comprising one thin layer of a non-porous material as a diffusion skin, and at least one layer of a porous material, wherein the porous layer has, when water wetted, a porosity $\phi$, thickness x(m) and tortuosity $\tau$ in relation to one another as given by $$x \cdot \tau = \phi \cdot S \qquad \text{Equation (1)}$$

where S has a value of 0.0015 meter or lower,
wherein the porous layer, when an amount of a first water feed stream containing salt is contacted with the diffusion skin, has properties related to a salt permeability parameter B defined by:

$$B = (\phi \cdot D \cdot (dc/dx)/\tau - J \cdot c) \cdot 1/\Delta c_s \qquad \text{Equation (2)}$$

wherein:
A is the water permeability and is greater than $1 \times 10^{-11}$ m/s/Pa,
B is the salt permeability (m/s) and is less than $3 \times 10^{-8}$ m/s,
$\Delta c_s$ is the salt concentration difference over the diffusion skin (moles/cm$_3$),
$\phi$ is the porosity and has an average value of more than 50%,
x is the thickness of the porous layer (m),
J is the water flux (m/s),
C is the salt concentration (moles/cm$_3$),
D is the diffusion coefficient of the salt (m$_2$/s),
$\tau$ is the tortuosity and is less than 2.5,
where the efficiency of the membrane in pressure retarded osmosis for a given value of a water permeability, A(m/s/Pa), can be expressed by an integration of Equation (2) to yield:

$$\Delta c_s/c_b = \exp(-d_s \cdot J/D)/\{1 + B \cdot [(\exp(d_f \cdot J/D + S \cdot J/D) - \exp(-d_s \cdot J/D)]/J\}$$

wherein:
$c_b$ is the difference in salt concentration between a second water feed stream and said first water feed stream, wherein said second water feed stream contains less salt than said first water feed stream (moles/cm$_3$), $d_f$ and $d_s$ are the thickness (µm) of the diffusion films on a side of the membrane contacting the second water feed stream and a side of the membrane contacting the first water feed stream, respectively, and $\Delta c_s/c_b$ is the efficiency of the membrane in pressure retarded osmosis for a given value of the water permeability, wherein said membrane is used to form a set of several membranes with flow breakers located between the membranes of the set of membranes, said flow breakers consisting of threads of polymer which form a net with square or rhombic pattern.

40. The semi-permeable membrane according to claim 39, wherein the membrane has a thickness which is less than 150 µm.

41. The membrane according to claim 39, comprising a diffusion film thickness of less than 60 µm.

42. The membrane according to claim 39, comprising a diffusion film thickness of less than 30 µm.

43. The membrane according to claim 39, wherein said several membranes have been packed together in layers to form modules where the distance between adjacent membranes is from 0.4 to 0.8 mm.

44. A semi-permeable membrane for pressure retarded osmosis, the membrane comprising one thin layer of a non-porous material as a diffusion skin, and at least one layer of a porous material, wherein the porous layer has, when water wetted, a porosity $\phi$, thickness $x(m)$ and tortuosity $\tau$ in relation to one another as given by $$x\tau = \phi \cdot S \qquad \text{Equation (1)}$$

where S has a value of 0.0015 meter or lower,
the porosity $\phi$ has an average value of more than 50%,
the tortuosity $\tau$ is less than 2.5,
a water permeability of the porous layer is greater than $1 \times 10^{-11}$ m/s/Pa, and
a salt permeability of the porous layer is less than $3 \times 10^{-8}$ m/s, and
wherein the membrane is configured for creating electric power through use of osmotic hydraulic elevated pressure created by said pressure retarded osmosis for driving at least one power turbine,
wherein said membrane is used to form a set of several membranes with flow breakers located between the membranes of the set of membranes, said flow breakers consisting of threads of polymer which form a net with square or rhombic pattern.

45. The semi-permeable membrane according to claim 44, wherein the membrane has a thickness which is less than 150 µm.

46. The membrane according to claim 44, wherein said several membranes have been packed together in layers to form modules where the distance between adjacent membranes is from 0.4 to 0.8 mm.

\* \* \* \* \*